Patented Dec. 8, 1931

1,835,841

UNITED STATES PATENT OFFICE

ERNEST GEORGE BECKETT, JOHN EDMUND GUY HARRIS, BIRKETT WYLAM, AND JOHN THOMAS, OF GRANGEMOUTH, SCOTLAND, ASSIGNORS TO SCOTTISH DYES, LIMITED, OF GRANGEMOUTH, SCOTLAND

SULPHURO-ANHYDRIDE COMPOUNDS OF PYRIDINES BASES

No Drawing. Application filed February 25, 1928, Serial No. 257,101, and in Great Britain February 25, 1927.

This invention consists in the production of sulphuro-anhydride compounds of tertiary bases.

The compounds formed by the condensation between tertiary bases, such as pyridine, and sulphur trioxide, known for example as pyridine sulphuro-anhydride, have previously been difficult to obtain in dry crystalline form, particularly in the form of powder. The best method previously recommended (Baumgatren, Berichte 59, 1926, 1166; Lapworth & Burkhardt, Journal of the Chemical Society 1926, 684) for the preparation of these substances has been to add one molecule of the tertiary base to one molecule of the ground sulphur trioxide of commerce ($S_2O_6$) covered with carbon tetrachloride. The reaction is violent and it is necessary to stop from time to time to break up the product owing to a tendency for the sulphur trioxide to be coated by the product formed. At the end of the reaction the product has then to be removed from the solvent by filtration, washed and dried.

Other methods have been recommended including the distillation of sulphur trioxide into the base with drastic cooling, followed by the addition of benzene.

We have discovered that sulphuro-anhydride compounds of tertiary bases may be obtained in the form of loose fine powders by causing substantially equi-molecular quantities of the tertiary bases and sulphur trioxide to react together in a very fine state of subdivision, that is in the form of a gas or mist. The process consists briefly in bringing together in an intimate way in a suitable reaction vessel equi-molecular amounts of a tertiary organic base, such as pyridine or dimethylaniline and sulphur trioxide with or without a gaseous diluent and in a finely divided condition, preferably in the form of a fine mist or vapour. In the case of pyridine the reaction appears to be (a)  $C_5H_5N$  +  $SO_3$  = $C_5H_5NSO_3$
    pyridine    sulphur    Pyridine sulphuro-
                   trioxide    anhydride.

In the case of dimethylaniline the reaction appears to be

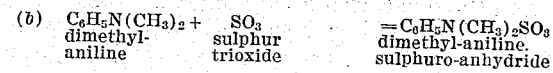

Pyridine sulphuro-anhydride appears to have the constitution:—

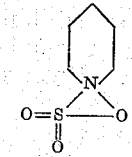

Dimethylaniline sulphur-trioxide appears to have the constitution:—

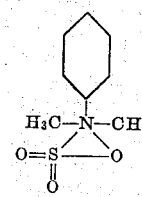

Drops and large aggregates of particles are to be avoided. When the reagents are brought together in the form of vapours, the vapours may be saturated or they may be diluted with an inert gas or gases, that is a gas or gases which do not react with either of the reagents under the conditions used for the process. A suitable diluent is dry air, but other inert gases may be used.

Several methods may be employed for bringing the reacting substances into contact in equi-molecular amounts in a finely divided condition. For example, the tertiary base may be distilled at a uniform rate and conducted, whilst still maintained in the form of vapour, into the reaction vessel, or the tertiary base may be heated to a suitable temperature and a current of an inert gas such as dry air passed through it at a suitable rate which may be varied so as to control accurately the amount of vapour passing. Either the whole of the tertiary base may be distilled or carried over by a diluent gas at a steady rate or small measured portions of the liquid may be led into a suitably heated or designed gasifying vessel or atomizer where it may be rapidly converted to a gas or mist as the case may be. This latter method is particularly easy to control, as it involves measurements of volumes of liquids rather than of gas. In whatever manner the tertiary base is brought into the reaction vessel, it is there brought into contact with an equi-molecular amount of sulphur trioxide with or without a diluent. The sulphur trioxide may be prepared by heating the calculated amount of oleum to a suitable temperature and then conducting the sulphur trioxide evolved into the reaction vessel with or without a diluent inert gas. As in the case of the tertiary base, either the whole of the calculated amount of oleum may be heated and the gas therefrom led at a measured rate into the reacting vessel, or smaller portions equivalent to the portions of tertiary base mentioned above may be measured into a heated vessel where the sulphur trioxide is rapidly driven off.

Other sources of sulphur trioxide may be used. For example, commercial sulphur trioxide may be heated whereby it may either sublime or otherwise vaporize. The process may conveniently be carried out in conjunction with processes for the preparation of sulphur trioxide by the contact method. In this case the sulphur trioxide with the inert diluent gases with which it is usually associated may be led direct from the contact mass to the reaction vessel, where it comes into contact with the pyridine. In conducting the sulphur trioxide into the reaction vessel, all the connections should be as short as possible and may be heated if desired. The formation of the so-called beta-form of sulphur trioxide is to be avoided.

Besides commercial sulphur trioxide and oleum, other suitable sources of sulphur trioxide may be employed. For example chlor-sulphonic acid may be vaporized or atomized and brought into contact with the tertiary base when, as is well known, the tertiary base sulphuro-anhydride compound and the hydrochloride of the base result. In this case, two molecules of the tertiary base are desirable to one of sulphur trioxide.

The reaction appears to be

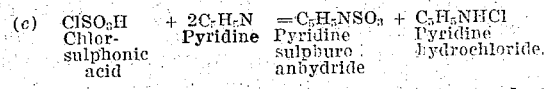

(c) ClSO₃H + 2C₅H₅N = C₅H₅NSO₃ + C₅H₅NHCl
Chlor-     Pyridine  Pyridine    Pyridine
sulphonic             sulphuro    hydrochloride.
acid                  anhydride Again, the vapour or mist from an alkyl ester of chlor-sulphonic acid may similarly be brought into contact with the tertiary base, whereby a mixture of the tertiary base, sulphuro-anhydride and the quaternary alkyl chloride of the base is formed. In the case of the methyl ester of chlor sulphonic acid the reaction appears to be as follows

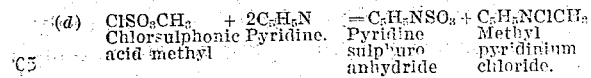

(d) ClSO₃CH₃ + 2C₅H₅N = C₅H₅NSO₃ + C₅H₅NClCH₃
Chlorsulphonic Pyridine. Pyridine      Methyl
acid methyl             sulphuro      pyridinium
                        anhydride     chloride.

These methods of utilizing chlor-sulphonic acid and its alkyl esters are particularly useful when the presence of hydrochlorides or quaternary alkyl halides is advantageous or not objected to.

A convenient method of eliminating troubles due to the condensation of sulphur trioxide and the base is one in which three tubes are arranged concentrically. The inner tube is suitably heated with steam or other means, the sulphur trioxide vapour or other material is led into the second tube from which it can enter into the reaction chamber and the outer tube is used for conveying the base into the reaction chamber.

The reaction chamber which is retained at a suitable temperature by cooling may be stationary, in which case it may be provided with suitable revolving vanes capable of mixing the reacting gases or mists, or it may be rotated or shaken so as to cause movement and subsequent mixing of the reacting substances. The reaction vessel itself may be comparatively large so as to afford ample condensing surface whereon the powdered product may collect, or it may be comparatively small in which case it may be connected with a larger vessel which may also be cooled and in which the resulting compound may be collected. Owing to the tendency of the powdery products to collect together and choke all the connections, means of access for scrapers should be provided with all connections.

Where currents of air have been used to dilute the reacting substances as described above, these may be sufficient to carry forward the finely divided powder into the collecting or settling vessels, but a supplementary current of air or other suitable gas may if necessary be passed into the reacting chamber to carry forward the finely powdered product. Such a supplementary current of air may also be used as a cooling agent and diluent, by which the vigour of the reaction may be to some extent controlled and also it may serve as a means for agitating the mixture of gas or vapour.

It is an advantage that the product of the reaction should be allowed to settle freely, and should not be subjected to any pressure such as may cause it to cake on the sides of the reacting or collecting vessels. If necessary, the emergent current of gases carrying the sulphuro-anhydride compound in a fine state of division may be caused to impinge on screens or on cooled rollers or any other suitable surface upon which it may collect and from which it may be subsequently removed. Any suitable method may be used for extracting the pyridine sulphuro-anhydride dust from the emergent gases; thus it may be separated by means of cyclone separators or precipitated electrically, or other suitable devices may be used. The sulphuro-anhydride compounds prepared in this way are obtained in the form of loose white powders resembling snow. They may be readily stored and handled and are in a very suitable form for use in many processes, such as for example for the preparation of esters of vat dyestuffs and for the sulphonation of various hydrocarbons.

The invention in brief consists in a process for producing sulphuro-anhydride derivatives of tertiary organic bases consisting in bringing into contact substantially equi-molecular quantities of a tertiary organic base and sulphuric anhydride or a substance capable of yielding a sulphuric anhydride derivative with the tertiary base in the form of vapours, gases, mists or sprays with or without the presence of inert gases.

The invention also consists in processes substantially as herein described and products which may be made by those processes or by the equivalents thereof.

The following example illustrates how the invention may be carried into effect, all parts referred to being parts by weight:—

Into a vessel heated to a temperature of about 120° C. are charged 65 parts of pyridine, whilst into a similar vessel heated to 100° C. are charged 100 parts of oleum containing 65 per cent. of free sulphur trioxide. Through the charge in each vessel is passed a rapid current of dry air whereby the sulphur trioxide from the oleum and the pyridine are driven over by separate and distinct connections in the form of vapour into the reaction vessel. The connections through which the sulphur trioxide and pyridine vapour pass are heated by means of a steam jacket so as to prevent condensation as far as possible.

The vaporized gases meet in the reaction vessel which is rotated whereby the gases are intimately mixed and combine together to form pyridine sulphuro-anhydride. The reaction vessel is cooled, for example, by spraying with water or by rotating in a trough of cold water. This reaction vessel is connected with a larger stationary vessel upon the walls and floor of which the pyridine sulphuro-anhydride collects in the form of a fine white snow-like powder. When the first charge of pyridine has been vaporized and the first charge of oleum has given up its $SO_3$, similar charges are allowed to enter the vaporizing vessels and the process is repeated. In this manner small successive charges of pyridine and oleum are fed into the vaporizing vessels until sufficient of the pyridine sulphuro-anhydride has been prepared. The size of charge taken is preferably such that when completely vaporized its volume does not exceed that of the reaction vessel, but by prolonging the period of vaporizing the size of charge may be relatively increased.

In the above example a mist or spray of pyridine may be substituted for the pyridine vapour. This may be formed by forcing the tertiary base under pressure through a fine orifice, subjecting it to a current of compressed air in the ordinary way of producing sprays. The oleum may be similarly sprayed into the reaction vessel, in which case larger amounts of pyridine would be necessary in order to form pyridine sulphate with the excess of sulphuric acid present.

Any suitable method of producing sprays, mists or vapours of the reacting substances may be employed, that is to say, any suitable methods for atomizing or converting liquids into vapours or mists, of which methods a large number are known.

Having now described our invention, what we claim as new and desire to secure by Letters Patent is:—

1. A process for producing pyridine sulphuro-anhydride which consists in bringing together substantially equi-molecular quantities of pyridine and sulphuric anhydride in a finely divided condition.

2. A process for producing pyridine sulphuro-anhydride which consists in spraying together substantially equi-molecular quantities of pyridine and sulphuric anhydride, the latter being obtained by passing a current of inert gas through oleum.

3. The process which consists in charging pyridine into a vessel heated to a temperature of about 120° C., charging an amount of oleum containing the equivalent quantity of free sulphur-trioxide into another vessel heated to about 100° C., passing a rapid current of dry air through the charge in each vessel and bringing together the resultant vapours in a third vessel.

4. A process for producing pyridine sulphuro-anhydride which consists in forcing pyridine in a mist or vapour-like condition into contact with sulphur trioxide in a mist or vapour-like condition.

5. A process for producing sulphuro anhydride derivatives of pyridine bases which consists in bringing into contact substantially equimolecular quantities of a pyridine base and sulphuric anhydride in a finely divided condition.

6. A process for producing sulphuro anhydride derivatives of pyridine bases which consists in bringing into contact substantially equimolecular quantities of a pyridine base and sulphuric anhydride in the vapour phase.

7. A process which consists in bringing together equimolecular quantities of pyridine and sulphur trioxide in the vapour phase.

In testimony whereof we have signed our names to this specification.

ERNEST GEORGE BECKETT.
JOHN EDMUND GUY HARRIS.
BIRKETT WYLAM.
JOHN THOMAS.